United States Patent
Kent

[15] 3,683,593
[45] Aug. 15, 1972

[54] GAS SCRUBBER HAVING TILTABLE GRIDS AND METHOD OF USING

[72] Inventor: Roger E. Kent, Mount Prospect, Ill.
[73] Assignee: National Dust Collector Corporation, Skokie, Ill.
[22] Filed: April 23, 1970
[21] Appl. No.: 31,227

[52] U.S. Cl. ...................55/91, 55/99, 55/233, 55/496, 55/512
[51] Int. Cl. ..........................................B01d 47/00
[58] Field of Search......55/233, 512, 490, 98, 99, 91, 55/496; 210/291, 293, 455, 477; 261/94–107

[56] References Cited

UNITED STATES PATENTS

| | | | |
|---|---|---|---|
| 2,160,549 | 5/1939 | Kurth | 261/98 |
| 3,348,364 | 10/1967 | Henby | 261/98 X |
| 3,348,825 | 10/1967 | McIlvaine | 261/95 X |

Primary Examiner—Robert L. Lindsay, Jr.
Assistant Examiner—Robert L. Lindsay, Jr.
Attorney—Mason, Kolehmainen, Rathburn & Wyss

[57] ABSTRACT

A gas scrubber comprising a housing having an inlet for contaminated gas adjacent the lower end and an outlet for cleansed gas adjacent the upper end. A filter bed extends across the housing intermediate the inlet and the outlet and the filter bed includes a supporting grid structure and a plurality of separate, movable, filter elements stacked several layers deep on the grid. Adjustable support means is provided for tilting the grid structure in the housing relative to the horizontal and control means is included for automatically adjusting said support means to change the angle of tilt, thereby effecting lateral displacement of said filter elements around said filter bed to provide self-cleaning of said elements.

15 Claims, 6 Drawing Figures

PATENTED AUG 15 1972
3,683,593
SHEET 1 OF 2
Fig. 1
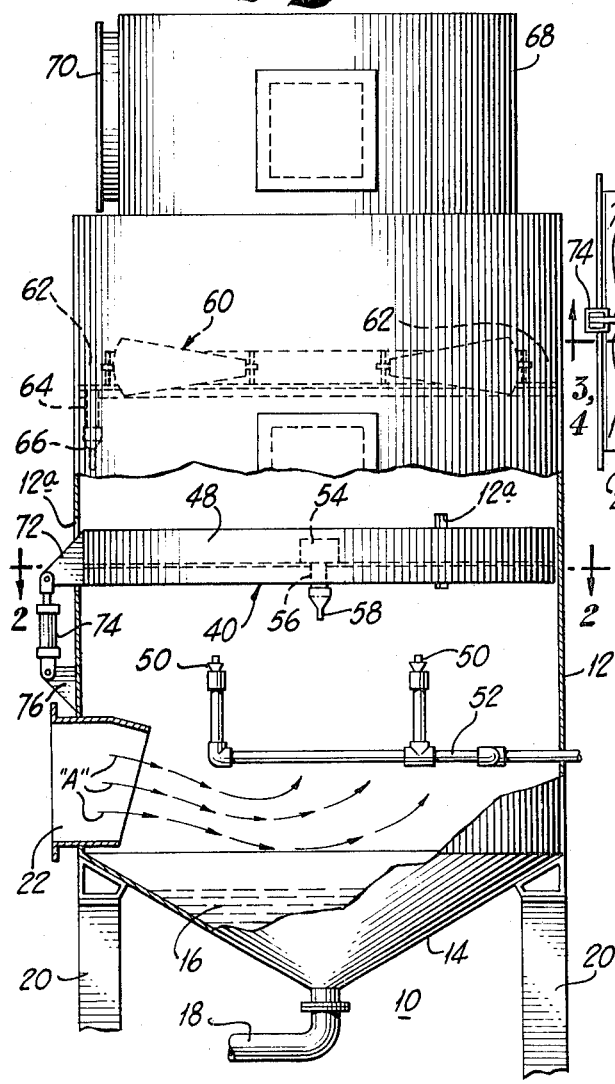
Fig. 2
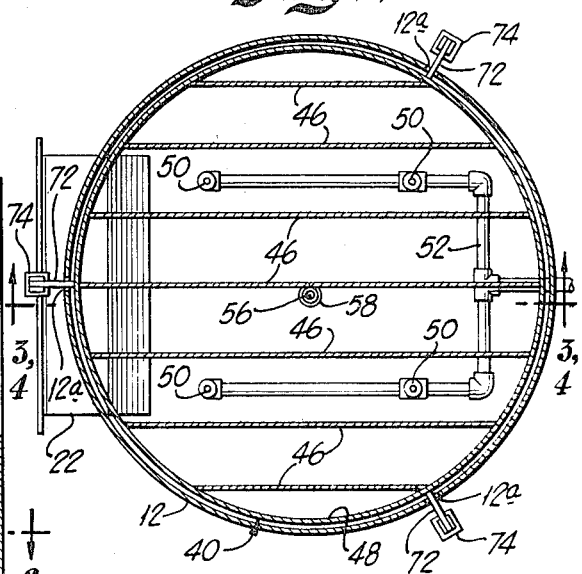
Fig. 4
Fig. 3
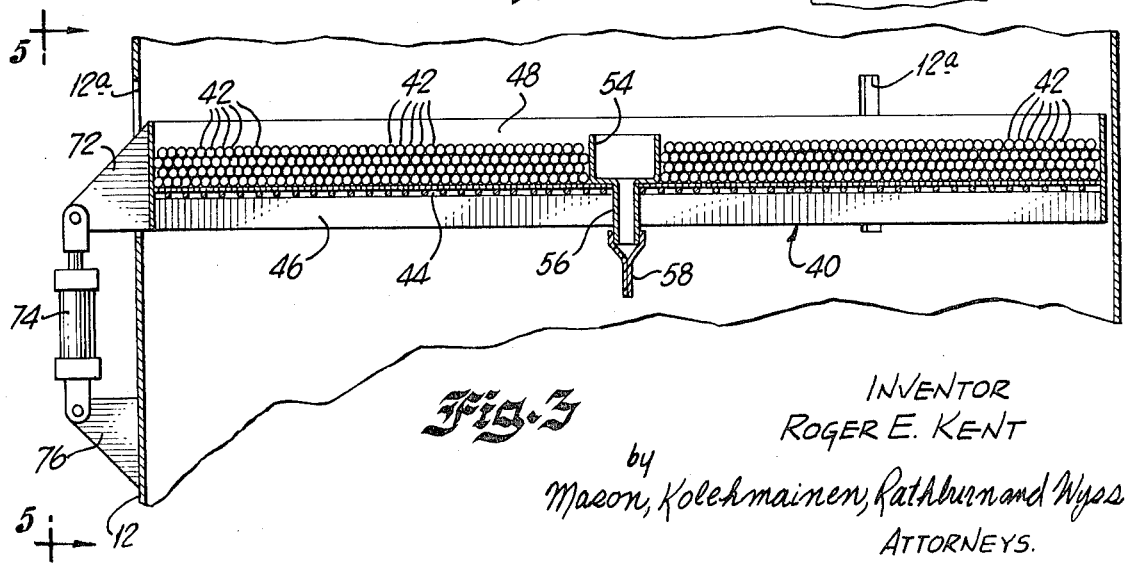
INVENTOR
ROGER E. KENT
by
Mason, Kolehmainen, Rathburn and Wyss
ATTORNEYS.

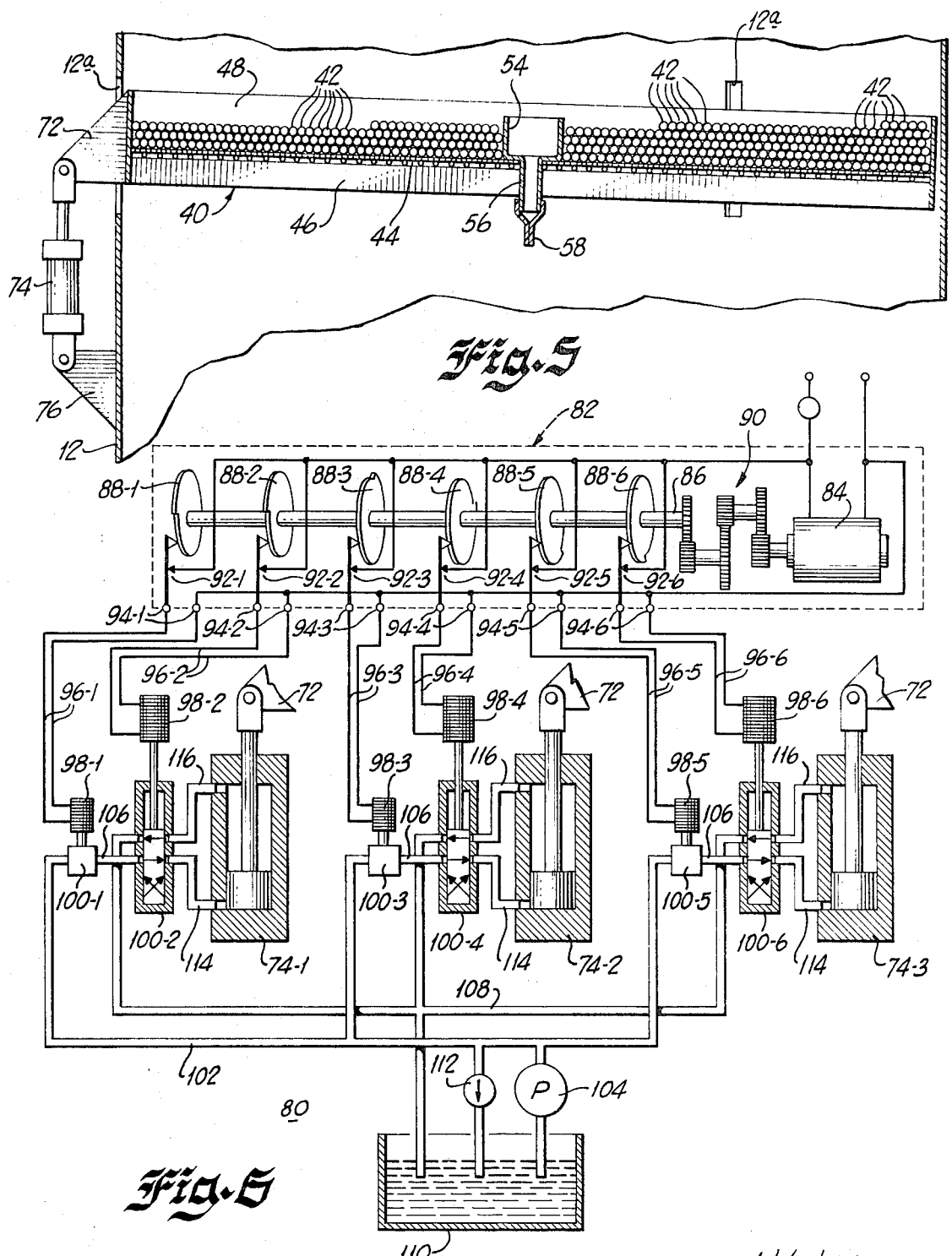

GAS SCRUBBER HAVING TILTABLE GRIDS AND METHOD OF USING

The present invention relates to a new and improved gas scrubber and, more particularly, to a new and improved wet-type gas scrubber wherein scrubbing liquid is used for collecting and removing contaminant particles and fume from industrial gases and the like.

The gas scrubber of the present invention is an improvement over the apparatus described and claimed in the copending U.S. patent application Ser. No. 809,231, filed Mar. 21, 1969, which apparatus comprises a gas scrubber having an upright housing and a horizontal filter bed across the housing at a level spaced between an upper outlet and a lower inlet. The filter bed comprises a grid structure for supporting a plurality of separate, movable, filter elements several layers thick. The filter elements are wetted with scrubbing liquid whereby the contaminated gas flowing upwardly through the filter bed is wetted and the contaminants in the gas are collected in the scrubbing liquid. Contaminated liquid droplets collect and enlarge on and around the surface of the filter elements and a layer of bubbles or foam is formed in the filter bed and immediately thereabove. Within the foam bed, intense foaming action takes place and contaminant particles migrate into and are collected in the liquid droplets, which droplets grow in size and eventually are removed from the housing in contaminated scrubbing liquid. Purified gas flows upwardly of the filter bed through a demisting section and is discharged from the scrubber through the outlet of the housing.

One of the problems occurring in gas scrubbers of the type described is that the filter beds sometimes become plugged up and the surface of the filter elements becomes covered with contaminant material so that the wetting action is less effective. This condition results in lower collection efficiencies and greater power requirements for operation. Moreover, if the filter elements are not cleaned periodically, a complete plugging or clogging of the filter bed occurs, resulting in a costly shutdown for cleaning and repair.

In the present invention, means is provided for lateral displacement and movement of the filter elements around the filter bed to provide a self-cleaning action for the elements and more efficient scrubbing action. The filter elements are laterally displaced and moved around the filter bed on a continuous or periodic basis by tilting of the supporting grid structure, and this action is effective to remove and break off accumulations on the surface of the elements.

It is an object of the present invention to provide a new and improved gas scrubber of the type described.

It is another object of the present invention to provide a new and improved gas scrubber having means for continuously or periodically changing the angle of tilt of the supporting grid structure beneath the filter elements to provide for lateral displacement of the elements around the filter bed.

It is an object of the present invention to provide a gas scrubber of the character described having a new and improved filter bed employing a plurality of separate, movable, filter elements and automatic means for adjusting the angle or tilt of a supporting grid structure below the filter elements whereby the elements are laterally displaced around the filter bed on a continuous or periodically repetitive basis.

Another object of the present invention is to provide a new and improved filter bed of the character described which is self-cleaning and highly resistant to clogging or plugging up.

Another object of the present invention is to provide a new and improved gas scrubber of the character described having means for continuously or periodically causing the elements in the filter bed to move in lateral displacement around the bed and thereby provide more efficient scrubbing action.

The foregoing and other objects and advantages of the present invention are accomplished in an illustrated embodiment thereof comprising a new and improved gas scrubber having an upstanding housing with an inlet for contaminated gas adjacent the lower end and an outlet for cleansed gas adjacent the upper end. A filter bed extends horizontally across the housing between the inlet and outlet and the filter bed includes a supporting grid structure and a plurality of separate, movable filter elements arranged in several layers on the grid. Adjustable support means is provided for adjusting the tilt or angle of the grid relative to the horizontal, and control means is included for automatically adjusting said support means to change the angle of tilt on a continuous or periodic repetitive basis whereby the filter elements are laterally displaced and moved around the bed.

For a better understanding of the present invention reference should be had to the following detailed description taken in conjunction with the drawings, in which:

FIG. 1 is a side elevational view with the portions broken away and in section of a new and improved gas scrubber constructed in accordance with the features of the present invention;

FIG. 2 is a transverse cross-sectional view of the scrubber taken substantially along line 2—2 of FIG. 1;

FIG. 3 is an enlarged, fragmentary, vertical, sectional view taken substantially along line 3—3 of FIG. 2 and showing one operative position of the filter bed;

FIG. 4 is an enlarged, fragmentary, vertical, sectional view taken substantially along line 4—4 of FIG. 2, illustrating the filter bed in another operative position;

FIG. 5 is a fragmentary, side elevational view looking in the direction of the arrows 5—5 of FIG. 4 and illustrating one form of adjustable support means in accordance with the present invention; and FIG. 6 is a schematic diagram showing one form of a control system for controlling the adjustable support means to change the angle of tilt of the filter bed on a continuous or periodically repetitive basis.

Referring now, more particularly, to the drawings, therein is illustrated a new and improved gas scrubber 10 constructed in accordance with the features of the present invention and especially adapted for collecting and removing contaminant particles and fumes from industrial gases and the like. The scrubber 10 includes an upstanding, generally cylindrical housing section 12 having a conically shaped bottom wall 14 at the lower end, which forms a liquid sump 16 for receiving contaminated scrubbing liquid containing the contaminants removed from the gases. The liquid in the sump 16 is maintained at a relatively constant height or level and the liquid is drained from the sump through an outlet drain line 18 which leads to a treatment system or sewer.

The scrubber 10 is supported on a plurality of legs 20 and the contaminated gases to be cleaned are introduced into the lower end of the scrubber housing 12 through an inlet fitting 22 which extends through one side of the housing wall and directs the gas flow slightly downwardly toward the surface of the liquid in the sump 16, as indicated by the flow arrows "A" (FIG. 1). The incoming gases pass across the scrubbing liquid in the sump 16 and then flow upwardly in a generally vertical direction toward the upper end of the housing.

In accordance with the present invention, the gas scrubber 10 includes a filter bed 40 (best shown in FIGS. 1, 3, and 4), which bed comprises a plurality of individually separate, movable, filter elements 42, such as spherical glass marbles, or other types of elements. The spherical filter elements 42 are supported several layers deep upon a grid structure 44 (FIGS. 3 and 4) formed of wire mesh or perforated sheet metal, and the grid is supported upon a plurality of spaced-apart, parallel bars 46 (FIG. 2). The bars 46 extend transversely across the housing section and are connected at opposite ends to a cylindrical ring member 48 having a diameter slightly less than that of the housing 12 and of sufficient height to extend above the level grid mesh 44 to contain the filter elements 42.

Scrubbing liquid (normally water) is supplied to wet the surfaces of the filter elements 42 by means of a plurality of spray nozzles 50 disposed below the filter bed 40 and adapted to spray finely divided droplets of scrubbing liquid on the underside of the filter bed so that the upwardly moving gases and contaminants therein impinge on the liquid film which wets the surface of the filter elements. The contaminants in the gas agglomerate and collect in the gas-borne droplets of liquid spray and in the liquid film which wets the surface of filter elements as the gas passes upwardly through the voids between the elements in the filter bed. Water or other scrubbing liquid is supplied to spray nozzles 50 through a piping and manifold system 52 at a controlled rate, and when the gases and liquid droplets or spray from the nozzles 50 pass through and mix intimately in the many tortuous and devious passages and voids between the filter elements 42 in the filter bed 40, an intense foaming or scrubbing action develops. The scrubbing action produces a foam bed (FIG. 7) or bubble layer in the upper layers of the elements and above the filter bed.

In order to drain off the contaminated liquid from the filter bed 40 and maintain the foam bed or turbulent layer at a desired upper level, the filter bed is provided with a weir or drain cup 54 having an open upper end and a drainpipe 56 which extends downwardly through the grid mesh 44 below the filter bed. The lower end of the drainpipe is closed with a rubber sock-type valve 58 which opens and closes intermittently to drain off liquid from the bed from time to time when a sufficient liquid head builds up.

After the gas is scrubbed and cleansed in the filter bed 40 and passes through the turbulent foaming layer, it flows upwardly through a rotary demisting vane assembly 60 (dotted lines FIG. 1), and the denser liquid particles are centrifuged outwardly against the inside surface of the housing wall. Even the smaller liquid droplets are centrifugally separated out of the upwardly spiraling gas stream and the separated liquid collects on the housing wall and flows downwardly into an annular collecting trough 62. Liquid collected in the trough 62 is drained out through a line 64 having a rubber sock valve 66 on the lower end and spills onto the foam bed. The demisting vane assembly 60 is similar in construction and operation to the separator assembly shown in U.S. Pat. No. 3,348,364, which patent is incorporated herein by reference.

After demisting in the rotary vane assembly 60, the gas flows upwardly into a plenum chamber 68 at the upper end of the housing 12. The plenum chamber is provided with a flanged outlet fitting 70 for connection with an exhaust duct or stack, and fan means (not shown) is normally provided for moving the gas through the scrubber 10. The fan means can be connected on the inlet side of the scrubber system for moving the gas into the housing 12 under positive pressure, or may be connected into the exhaust side of the system to move the gas through the scrubber by suction.

In accordance with the present invention, the filter bed 40 is tilted or angularly adjusted (FIGS. 3 and 4) relative to the horizontal so that the filter elements 42 will be displaced laterally in the filter bed on a continuous or periodically repetitive basis during scrubber operation. As the grid mesh 44 is tilted one way or the other out of a level or horizontal position (FIG. 3), the spherical filter elements 42 roll and shift position laterally around the bed. The elements contact each other during the rolling or shifting movement, and this action tends to keep the surfaces of the elements clean and removes material which would otherwise build up and collect on the elements. The surfaces of the elements 42 are continuously being cleaned by the movement of the elements caused by tilting of the grid mesh 44 and, additionally, the buoyant upward force of the high velocity gas tends to cause continuous vertical movement of the filter elements in the bed from one layer to another. As shown in FIG. 4, when the filter bed is tilted relative to the horizontal, the bed is deeper or thicker on the right-hand side than on the left-hand side because of lateral rolling or shifting of the elements. In order to provide for the continuous or periodically repetitive tilting or angular adjustment of the filter bed 40 in the housing 12, a plurality of support brackets 72 (FIG. 2) are welded or otherwise secured at circumferentially spaced positions to the ring 48, and these brackets extend outwardly through vertical slots 12a formed in the housing shell. Each bracket is supported by a fluid cylinder 74 pivotally connected thereto. The lower ends of the cylinders 74 are pivotally supported on support brackets 76 which are welded or otherwise attached to the outside of the housing shell in vertical alignment with the slots 12a. Each cylinder 74 is independently adjustable in length to provide the desired tilt or angle of the grid mesh 44 relative to the horizontal, and by continuously or periodically adjusting or changing the tilt angle of the filter bed grid mesh 44, the desired type of element movement around the filter bed can be achieved and controlled.

It should be understood that instead of the fluid cylinders 74, other types of adjustable support members, such as power driven jack screws or motor driven eccentric cams, could be used. Moreover, instead of using three fluid cylinders 74, a single fluid cylinder could be used in combination with a single nonadjustable pivotal support member, or the other two fluid cylinders could be replaced with manually adjustable support members, such as turn-buckles or the like.

In order to continuously or periodically change the angle or tilt of the grid mesh 44 relative to the horizontal on a repetitive basis and thereby cause the individual filter elements 42 to be horizontally or laterally displaced in the filter bed, a control system 80, indicated schematically in FIG. 6, is provided to control the action of the several fluid cylinders 74 which support the filter bed. The control system 80 includes an electric timer 82 having a synchronous motor 84 which drives a timing shaft 86 through a gear reduction system 90. A plurality of cams 88-1, -2, -3, -4, -5, -6 are mounted on the shaft, and each of the cams is adapted to control the making or breaking of a respective pair of switch contacts 92-1, -2, -3, -4, -5, -6, which are operable to supply current to respective terminal pairs 94-1, -2, -3, -4, -5, -6. The terminal pairs supply electric current through respective supply leads 96-1, -2, -3, -4, -5, -6 to energize respective solenoid coils 98-1, -2, -3, -4, -5, -6 for controlled timed intervals. The solenoid coils 98-1 and 98-2 are adapted to control the operation of a first fluid cylinder 74-1 and, correspondingly, the solenoid coils 98-3 and 98-4 control the operation of a second cylinder 74-2, and the solenoid coils 98-5 and 98-6 control the operation of a third fluid cylinder 98-3. Obviously, a different number of cylinders could be used if desired and the number of cam wheels and solenoid coils would be changed to correspond thereto. The solenoid coils 98-1, -3, -5 are set up to control the operation of hydraulic or pneumatic high pressure shutoff valves 100-1, -3, -5, respectively, which are two-position valves having inlet ports connected to a common fluid pressure supply conduit 102 which may be supplied fluid from the outlet side of a hydraulic pump 104 or air compressor. Solenoid coils 98-2, -4, -6, respectively, are set up to control respective two-position reversing valves 100-2, -4, -6. Each reversing valve has a pressure inlet port, an exhaust port, an "up" side port and "down" side port. The inlet ports of the reversing valves are connected to the outlet side of the respective shutoff valves 100-1, -3, -5, through short conduits 106, and the exhaust ports of the reversing valves are connected to a common return or exhaust conduit 108 which, in the case of a hydraulic system, returns the hydraulic fluid to a sump 100. The pump 104 delivers fluid from the sump 110 into the supply conduit 102 at working pressure and a suitable relief valve 112 is provided to limit the maximum pressure of the system. The "up" side ports of the reversing valves 100-2, -4, -6 are connected to the lower end of the respective actuating fluid cylinders 74-1, -2, -3 through "up" side conduits 114 and the "down" side ports of the reversing valves are connected to the upper ends of the respective actuating cylinders through conduits 116.

As shown in FIG. 6, the pistons of all of the fluid cylinders 74-1, -2, -3 are shown in the lower or rest position and, with the cylinders in this condition, the grid screen 44 of the filter bed 40 is in a generally horizontal position, as shown in FIG. 3. When the timer motor 84 is energized and begins to run, the cams 88-1, -2, -3, -4, -5, -6 begin to rotate and, as this occurs, electrical energy is first supplied to the solenoid coil 98-1 for a selected period of time to open the valve 100-1 and thereby supply pressurized fluid to the lower end of the first fluid cylinder 74-1. As the fluid enters the cylinder, the piston is elevated and the filter bed 40 begins to tilt or rotate in a clockwise direction from the horizontal position (FIG. 3) to a sloping or tilting position (FIG. 5). The amount of slope or angle of tilt of the filter bed support screen 44 is controlled by the length of time that the solenoid coil 98-1 remains energized, the value of the hydraulic pressure, and speed of upward movement of the piston in the fluid cylinder while the valve is energized. The timing interval can be set up and adjusted so that a desired amount of elevation of the piston in the fluid cylinder 74-1 is attained. At the end of the time period, contact is broken and the shutoff valve 100-1 returns to a closed position shutting off the supply of pressure fluid to the lower end of the cylinder. The filter bed 40 may be maintained in the tilted position (FIG. 5) for a selected interval of time or may be immediately returned to a horizontal position, if desired. After the shutoff valve 100-1 is closed, fluid between the "up" side port of the shutoff valve and the lower end of the fluid cylinder 74-1 is entrapped and cannot escape so that the piston rod remains in an upwardly extending position. The "down" side or upper end of the fluid cylinder 74-1 is connected through the conduit 116, valve 100-2, and return conduit 108 to the sump 110. When it is desired to lower or return the piston rod of the fluid cylinder 74-1 to the rest position, electrical current is supplied to energize the solenoid 98-2 and operate the reversing valve 100-2 by means of the timer cam 88-2, contacts 92-2, terminals 94-2, and the leads 96-2. When this occurs, fluid in the lower end of the cylinder 74-1 is exhausted to the sump and the weight of the filter bed 40 causes the piston in the cylinder 74-1 to return or move down to the lower or rest position.

From the foregoing, it will be seen that the timer 82 may be set up to obtain a desired cycle of operation for each of the fluid cylinders 74-1, -2, -3. For example, the piston in the cylinder 74-1 may be controlled to rise to a desired level while the pistons in the cylinders 74-2 and 74-3 are realigned in the lower or rest position. After the piston in the cylinder 74-1 reaches the desired elevated position, the piston may be retained at the elevated level for a selected period of time or may be returned downwardly to the rest position immediately. As the piston in the cylinder 74-1 starts downward, the piston of the cylinder 74-2 may be programmed to commence moving upwardly immediately, if desired, or it may be retained in the lower or rest position until the downward travel of the first piston is completed, or for a timed period thereafter. In this manner, the angle of slope or tilt relative to the horizontal of the grid mesh 44 may be continuously changed or may be changed on an intermittent periodic basis, as desired. Changing of the angle of tilt causes the individual spherical filter element balls 42 to move laterally of the grid mesh structure 44 and, as they move, they engage one another, and this action results in a self-cleaning interaction between the surfaces of the elements and also improves the wetting action of the gas impinging against the surfaces of the element. By adjustment of the timer system, the filter elements 42 can be made to travel in a circular direction (clockwise or counterclockwise) around the filter bed on a continuous basis or on an intermittent basis. The speed of travel may be controlled by adjusting the angle of slope or tilt of the support grid 44 or by adjusting the rate of change of the tilt angle. Continuous or periodically intermittent lateral displacement or rolling action of the individual filter elements 42 around the filter bed provides a self-cleaning action and eliminates or greatly reduces the chances of the filter bed becoming plugged up. Moreover, better wetting action on the gases is obtained because of the fact that the surfaces of the filter elements are much cleaner because of the improved self-cleaning action. Accordingly, higher contaminant collection efficiencies are achieved in the present invention along with the greatly improved operating characteristics and reduced maintenance.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A gas scrubber comprising a housing having an inlet for contaminated gas adjacent a lower end portion and an outlet for cleaned gas adjacent an upper end portion, a filter bed across said housing intermediate said inlet and outlet including a supporting grid and a plurality of separate, individually discrete filter elements relatively movable on said grid and arranged at least one layer thick thereon, adjustable support means for supporting said grid in said housing at one or more selected angles of tilt relative to the horizontal, and control means for repetitively adjusting said support means for changing said tilt angle of said grid and moving said filter elements over said grid.

2. The gas scrubber of claim 1 wherein said adjustable support means includes at least a pair of vertically adjustable support members mounted at spaced locations on said housing, said control means including means for changing the vertical length of one support member relative to the other.

3. The gas scrubber of claim 1 wherein said adjustable support means comprises at least one fluid cylinder having one end pivotally supported from said housing and an opposite end pivotally supporting said filter bed.

4. The gas scrubber of claim 3 wherein said control means includes means for supplying pressurized fluid to said fluid for adjustable time intervals for expanding and contracting the effective length thereof.

5. The gas scrubber of claim 4 wherein said control means includes timer means for controlling the supply of compressed fluid to expand said one fluid cylinder for a first period and to contract said cylinder for a second period.

6. The gas scrubber of claim 5 wherein said timer means is selectively adjustable to change the length of said periods and to set an adjustable third between said first and second periods.

7. A gas scrubber of the character described comprising a housing including an inlet for contaminated gas adjacent a lower end portion and an outlet for cleansed gas adjacent an upper end portion, a filter bed across said housing at a level intermediate said inlet and outlet including a support grid for holding a plurality of individually discrete, separate, filter elements relatively movable on and arranged in at least one layer on said grid, a plurality of adjustable support members for supporting said grid from said housing, and control means for repetitively changing the length of one of said support members relative to the other for changing the tilt of said grid for moving displacement of said filter elements around said filter bed.

8. The gas scrubber of claim 7 wherein said support members are adjustable between an expanded and a contracted condition, and said control means comprising means for initiating the adjustment of said support members in an operating cycle comprising expanding said members from a contracted condition to an expanded condition, maintaining said expanded condition for a selectively adjustable first period and returning said members to said contracted condition for a selectively adjustable second period.

9. The gas scrubber of claim 8 wherein said timer means includes means for initiating the adjustment of each of said support members on said operating cycles and means for sequencing the cycles of each support member in relation to the others.

10. The gas scrubber of claim 9 wherein said timer means includes means for providing a selectively adjustable dwell period between operative cycles of different support members.

11. The gas scrubber of claim 10 wherein said timer means includes means for continuously adjusting at least one of said support members whereby at least some of said filter elements are in continuous lateral movement around said filter bed.

12. A method of scrubbing gas to remove contaminants therefrom comprising the steps of wetting said gas by direct contact against the wetted surfaces of a plurality of individually discrete, separate, filter elements disposed for random displacement generally transversely of the general direction of flow of said gas, and repetitively moving said elements against and away from one another and generally laterally of said general direction of gas flow to provide fresh wetted surfaces for contact with said gas and to dislodge any materials tending to collect on the surfaces of said elements.

13. The method of claim 12 wherein said moving step comprises changing the angular relation of said elements in respect to said general direction of gas flow.

14. The method of claim 12 wherein said filter elements are moved in a circular direction around an axis parallel of said general direction of gas flow.

15. The method of claim 14 wherein said elements are spherical and roll during said lateral movement.

* * * * *